Oct. 20, 1959 S. M. BOOTH 2,909,082
AUTOMATIC FEED AND DEPTH CONTROL FOR A DRILL PRESS
Filed Sept. 6, 1956 3 Sheets-Sheet 2

INVENTOR.
SHELDON M. BOOTH
BY
Woodhams Blanchard & Flynn
ATTORNEYS

Oct. 20, 1959 S. M. BOOTH 2,909,082
AUTOMATIC FEED AND DEPTH CONTROL FOR A DRILL PRESS
Filed Sept. 6, 1956 3 Sheets-Sheet 3

INVENTOR.
SHELDON M. BOOTH
BY
Woodhams Blanchard & Flynn
ATTORNEYS

United States Patent Office 2,909,082
Patented Oct. 20, 1959

2,909,082

AUTOMATIC FEED AND DEPTH CONTROL FOR A DRILL PRESS

Sheldon M. Booth, South Haven, Mich.

Application September 6, 1956, Serial No. 608,257

2 Claims. (Cl. 77—6)

This invention relates to a control device for a drill press and, more particularly, to a device for automatically advancing the spindle of the drill press toward the work and for automatically de-energizing the motor rotating said spindle when such advancement has moved said spindle to a predetermined position.

While automatic feeding and shut off devices for a variety of types of machine tools have been well known for many years, the industry has never, to my knowledge, been offered such a device for use with a standard drill press as an external attachment which is both uncomplicated and inexpensive and requires no drilling, cutting or machining to install. Frequently, feeding and/or shut off attachments utilized, for example, to provide automation are necessarily an integral part of the machine, or they are extremely complicated. In either case, the cost involved is often greater than the economic value of the device for other than certain special, high production uses. Alternatively, the industry often uses multiple spindle drilling machines where production requirements call for the handling of several spindles by a single operator. However, the extreme cost of multi-spindle machines is well known and their inflexibility in operation is equally well known. Particularly, the individual spindles of multi-spindle drill presses are not well adapted to the simultaneous, independent operations which can be carried out by several independent, single spindle, drill presses. With a number of completely independent drill presses, adapted for operation by a single workman, much greater flexibility in production and much greater efficiency in utilization of manpower is obtained. This is particularly true where the workman operates one or more drill presses and some other machine, such as a lathe, at the same time. Thus, if a simple, inexpensive attachment enabling individual drill presses to be automatically fed and stopped can be provided, it will enable a small shop, or a hobbyist, to obtain a large measure of the efficiency of automatic operation.

Therefore, a principal object of the invention is to provide a device which can be readily attached to a standard drill press for automatically feeding or advancing the spindle thereof against the work and for stopping or de-energizing said press upon the completion of a predetermined amount of such advancement.

A further object of the invention is to provide a device, as aforesaid, which is of sufficient structural simplicity that it can be provided at a nominal cost and can be installed on a standard drill press with simple tools and by workmen of ordinary, and unspecialized, machine skill.

A further object of the invention is to provide a device, as aforesaid, which can be offered as a separate attachment for a standard drill press and can be installed thereon without any material modification of said press as furnished by its manufacturer.

A further object of the invention is to provide a device, as aforesaid, wherein the feeding pressure is resiliently supplied, can be readily varied to fit different operating requirements and can be manually overpowered without damage to the press, spindle or work piece, and wherein such feeding pressure automatically produces spindle advancement at a progressively decreasing rate, a type of operation which could be obtained heretofore only when the spindle was manually fed by a skilled operator.

A further object of the invention is to provide a device, as aforesaid, wherein the press is stopped by the de-energizing a motor rotating the press spindle, and wherein the point at which the motor is de-energized can be rapidly, accurately and easily adjusted.

A further object of the invention is to provide a device, as aforesaid, which is rugged in construction and will require relatively little maintenance in order to remain in satisfactory operating condition.

A further object of the invention is to provide a device, as aforesaid, which includes means for rapidly and positively locking the spindle in any position against axial movement, and for rapidly releasing said spindle from such position.

Other objects and purposes of the invention will be apparent to persons acquainted with apparatus of this general type upon reading the following specification and inspecting the accompanying drawings, in which.

Figure 1:
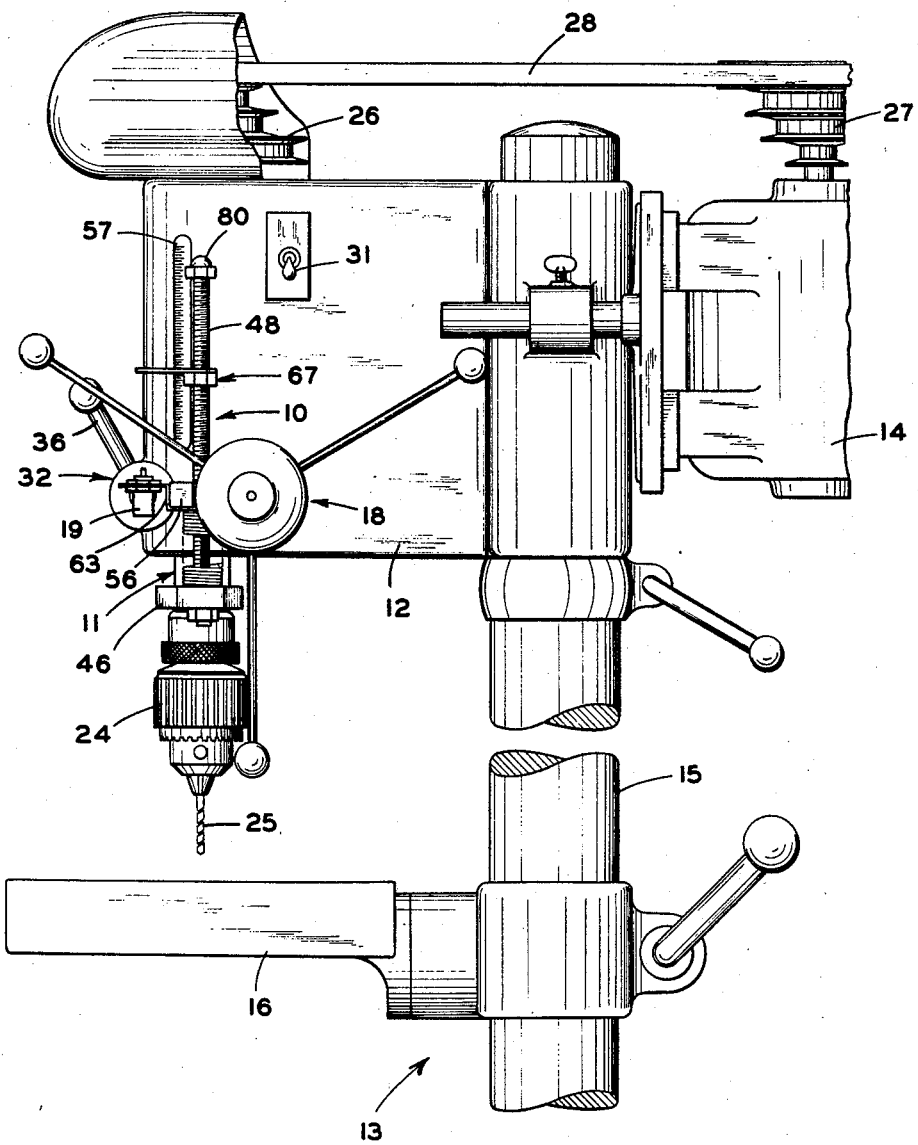
Figure 1 is a broken, side elevational view of the upper portion of a standard drill press embodying my invention.
Figure 2:
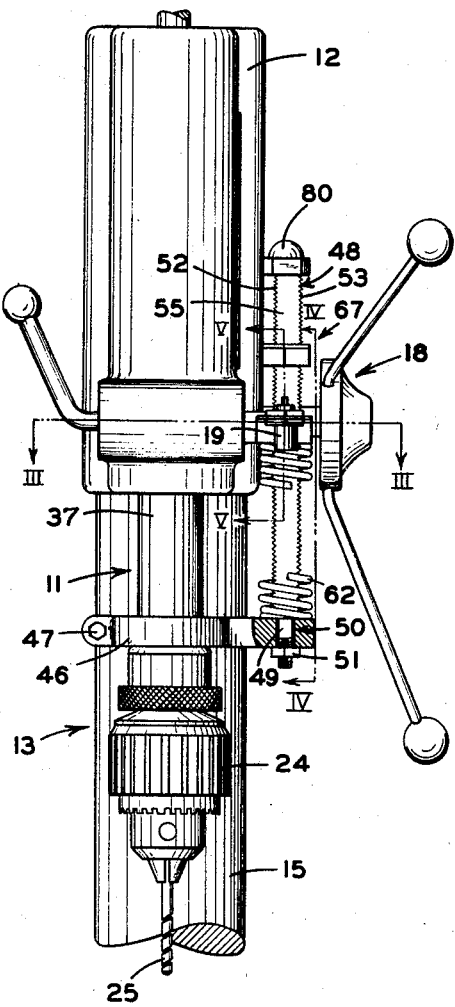
Figure 2 is a front elevational view of the spindle and spindle housing shown in Figure 1.

For purposes of convenience in description, the terms "upper," "lower," and derivatives thereof, will have reference to the drill press and associated parts thereof in its normal operating position, as appearing in Figures 1 and 2. The terms "left," "right," "front," "rear," and derivatives thereof, will have reference to the drill press in its normal operating position, as appearing in Figure 2. The terms "inner," "outer," and derivatives thereof, will have reference to the geometric center of the parts characterizing the invention.

*General description*

In order to meet the objects and purposes set forth above, as well as others related thereto, there has been provided a feed and depth control 10 (Figures 1 and 2) for the spindle 11, which latter is rotatably and axially reciprocably supported upon, and within, the spindle housing 12 of a substantially conventional, single spindle, drill press 13. The spindle housing 12, which adjustably supports a spindle motor 14, is vertically adjustably supported upon a post 15, which also supports a vertically adjustable work-supporting table 16 in a substantially conventional manner. The spindle housing 12 supports an adjustable, resilient mechanism 17 (Figure 3) for urging retraction of the spindle 11 upwardly, if so adjusted to any amount from zero to its resilient capacity, and a feed handle 18 for overpowering said resilient mechanism 17 and urging the spindle 11 downwardly.

The feed and depth control 10 of the invention includes resilient means, which is also designed to overpower the mechanism 17 and thereby urge the spindle 11 downwardly. Said feed control 10 also includes a toggle switch 19 which is actuated in response to a predetermined, downward movement of the spindle 11 with respect to the housing 12, whereby the spindle motor 14 is automatically de-energized.

Detailed construction

The spindle 11 (Figures 1 and 2), including the chuck 24 and bit 25 on the lower end thereof, may be of any convenient, conventional type which is rotatably and axially reciprocably supported within the front end of the spindle housing 12, also in a substantially conventional manner. Thus, a detailed disclosure of such spindle is believed unnecessary for the purposes of this invention although a general description and illustration is provided to aid in a full understanding of the invention.

Figure 4:
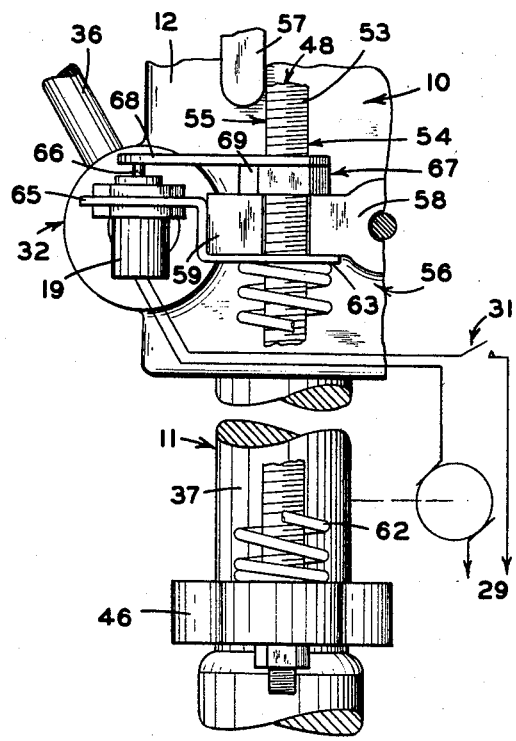
Figure 4 is a broken, sectional view, substantially as taken along the line IV—IV of Figure 2.

Said spindle 11 is rotated within the spindle housing 12 by means of the motor 14, which is connected to the upper end of said spindle 11 in a conventional manner by means of the pulleys 26 and 27 and the belt 28. The motor 14 may be connected to a source 29 of electrical energy (Figure 4) through an on-off switch 31 (Figures 1 and 4).

In this particular embodiment of a conventional drill press, the spindle 11 is held in the raised or retracted position, as shown in Figure 1, by means of the spindle brake 32 located in the front end of the housing 12. Said brake is comprised of a pair of brake shoes 33 and 34, which are internally, reversely threaded for threaded engagement by a correspondingly threaded screw 35 having a lever 36 secured thereto and extending from the spindle housing 12 near the front end thereof. Rotation of the screw 35 by manual movement of the lever 36 in one direction causes the brake shoes 33 and 34 to move toward each other, thereby frictionally engaging the exterior surface of the outer cylinder or quill 37 of the spindle 11.

The quill 37 (Figure 3) is provided with a vertical row of teeth 38 along the rear side thereof for engagement by a pinion 39 mountable upon, and rotatabe with, a shaft 41, which extends through, and is rotatably supported upon, the spindle housing 12 just rearwardly of the spindle 11. The manual feed handle 18 is secured to the right end of the shaft 41 exteriorly of the housing 12. The leftward end of the shaft 41 is engaged by said adjustable mechanism 17 which resiliently resists downward movement of said spindle when so adjusted. Said mechanism is comprised, for example, of a coil spring 42, the inner end of which is secured to the leftward end of the shaft 41, and a drum 43, which is secured to the outer end of, and encircles, said spring 42. Said drum 43 is adjustably supported upon the spindle housing 12 for varying the tension on the spring 42. The resilient mechanism 17 is arranged so that downward movement of the quill 37, hence of the spindle 11, will effect an increase in the tension on the spring 42.

Thus far, the description has been of a standard drill press for illustrative purposes only. The applicability of the apparatus of the invention to other types of drill presses will be obvious as the description proceeds.

The feed and depth control 10 of the invention includes a support bracket 46 (Figures 2 and 4) which is securely mounted upon the lower end of the rack cylinder 37, as by means of the bolt 47, and extends laterally therefrom. A depth control bar 48 is provided with a fully threaded, or cap screw, lower end 49, which is of reduced diameter and is received through an appropriate, vertical opening 50 through the outer end of the support bracket 46. A nut 51, or suitable threading in the opening 50 where the end 49 is formed as a cap screw, holds said bar 48 fixed with respect to the support bracket 46 and substantially parallel with the axis of the spindle 11.

Figure 6:
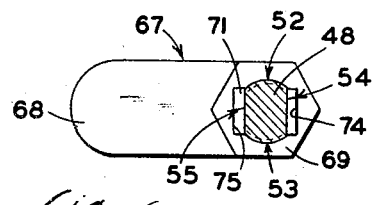
Figure 6 is a sectional view, substantially as taken along the line VI—VI of Figure 5.
Figure 7:
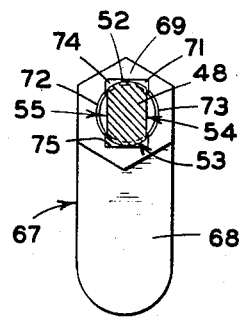
Figure 7 is a sectional view, substantially as taken along the line VI—VI of Figure 5, but showing a different operating position of the parts therein.

The portion of the bar 48 which extends upwardly from the bracket 46 (Figures 2 and 4) is threaded in a conventional manner on two opposing, lengthwise sides 52 and 53 thereof and is provided with two parallel, flat surfaces 54 and 55, which are disposed between, and alternately with, the threaded surfaces 52 and 53, as best shown in Figures 6 and 7. This arrangement, which produces an oblong cross-section, can be easily accomplished by machining off the threads on diametrically opposite sides of an elongated screw.

The drill press housing 12 (Figures 2 and 4) is provided with a lateral extension, such as the bifurcated boss 56, which is integral with one side thereof near the front end of said housing. The boss 56 provides vertical guidance for the depth control bar 48, said bar 48 replacing the one normally provided for guidance by said boss. A vertical scale 57 is ordinarily arranged on the housing 12 immediately above the boss 56 and adjacent to said depth control bar 48. The support bracket 46 is, therefore, positioned so that the depth control bar 48 can slide freely between the fingers 58 and 59 of said bifurcated boss 56 as said spindle is reciprocated.

This particular embodiment of the invention is directed primarily to a drill press having an integral extension, such as the boss 56, because the majority of standard spindle housings are conventionally so equipped. This is due to the fact that some such device is necessary to guide the depth gauge which is found on most drill presses. However, it will be recognized that a separate member corresponding to the boss 56 could be easily mounted upon the spindle housing, if necessary.

Figure 3:
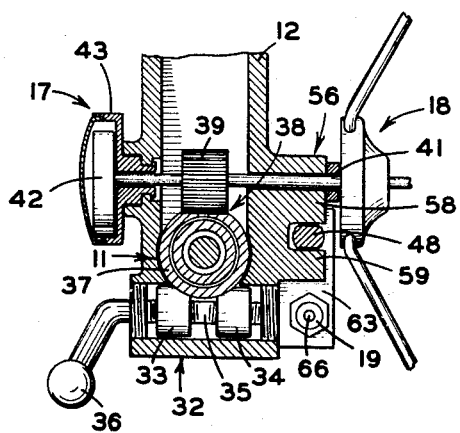
Figure 3 is a sectional view taken along the line III—III of Figure 2.

As shown in Figures 2 and 4, a relatively heavy, spiral spring 62 encircles the depth control bar 48 between the boss 56 and the support bracket 46, thereby urging the spindle 11 downwardly. Said spring 62, which is held under continuous compression between said boss 56 and said bracket 46, is of sufficient strength that it overpowers at all times the contrary, upward urging by the coil spring 42 (Figure 3).

A switch support plate 63 is disposed between the boss 56 and the spring 62, and has an appropriate opening 64 (Figure 5) through which the depth control bar 48 may extend. Said plate 63 has an upwardly offset portion 65, upon which the toggle switch 19 (Figures 4 and 5) is mounted. Said switch 19 is preferably of the type having a vertically operable plunger or actuator 66, whereby one depression of said plunger 66 closes the switch and the next succeeding depression of said plunger opens the switch, and so on. The switch support plate 63 positions the toggle switch 19 on the front side of the bifurcated boss 56.

The switch plunger 66 is actuated by an operating member 67 (Figures 5, 6 and 7) which is adjustably supported upon the depth control bar 48. Said switch operating member 67 is comprised, in this particular embodiment, of an elongated, preferably flat, element 68, which is secured to, and extends radially from, a conventional, hexagonal headed nut 69 having an oblong opening 71 therethrough, which is threaded along two, opposing walls, only. Such an opening may be provided by routing out diametrically opposed portions of the wall provided by the conventional threaded opening in the nut 69. Thus, the wall of said opening 71 has opposing, threaded portions 72 and 73 on opposite sides of, and spaced by, the routed or smoothly notched portions 74 and 75. Accordingly, as indicated in Figures 6 and 7, the nut 69 will be free to slide lengthwise of the depth control bar 48, which it embraces, when the oblong opening therein is substantially symmetrically aligned with the oblong cross-section of the bar 48. However, when the nut 69 is rotated a material distance, such as between 30 and 150 degrees, out of such alignment, it will threadedly engage said bar thereby preventing relative movement between said bar and said nut. Accordingly, after engagement has been established between the nut 69 and the bar 48, the possibility of accidental disengagement is virtually eliminated. It will be recognized, however, that the optimum position of threaded engagement occurs when said nut is rotated about 90 degrees (Figure 6) from its freely sliding position (Figure 7) with respect to said bar.

As illustrated in Figure 7, said nut 69 is disengaged from the depth control bar 48 and, therefore, may be slid upwardly or downwardly along the bar 48, when the element 68 is extending from said bar 48 in a direction substantially parallel with the flat surfaces 54 and 55 thereof. The opening 76 in the element 68 is sufficiently large to prevent interference of the element 68 with the bar 48 in either the engaged or disengaged position of the nut 69.

A lock nut 78 (Figure 8) may be provided with an oblong opening 79, which is substantially identical in shape with the opening 71 in the nut 69. Thus, both the switch operating member 67 and the lock nut 78 may be independently or simultaneously moved upwardly and downwardly along the depth control bar 48, after which said nut 78 is then rotated about said bar 48 in such a direction as to effect a quick, positive locking of the operating member 67 at any desired position lengthwise of the control bar 48.

Figure 5:
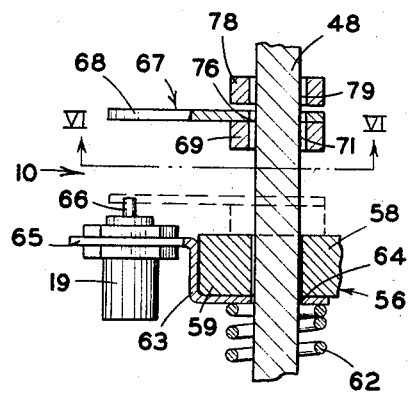
Figure 5 is a sectional view, substantially as taken along the line V—V of Figure 2.

As shown in Figure 5, the switch 19 is mounted so that the element 68 of the operating member 67 will depress the plunger 66 sufficiently to operate the switch 19 before the nut 69 engages the fingers 58 and 59 of the bifurcated boss 56. However, if for any reason the spindle 11 is permitted to go down into its extended position, as shown in Figure 2, the nut 69 will engage the boss 56 before the element 68 has urged the plunger 66 past its normal fully depressed position. Thus, the downward urging of the spiral spring 62 cannot cause the switch operating member 67 to injure either the plunger 66 or the toggle switch 19.

Figure 8:
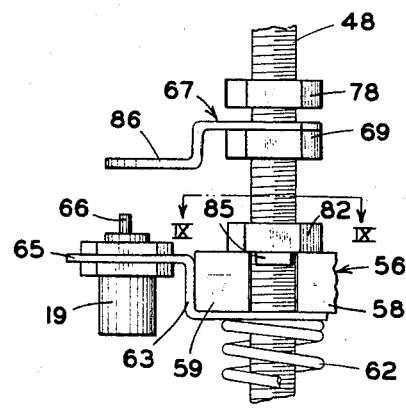
Figure 8 is a fragment of Figure 4, including a modification thereof.
Figure 9:
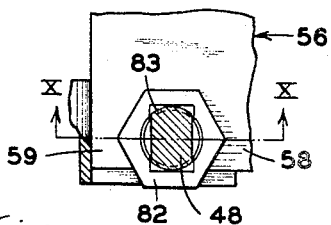
Figure 9 is a sectional view taken along the line IX—IX of Figure 8.

As described above, the spindle 11, in this particular embodiment, may be held against axial movement by the spindle brake 32. However, some drill presses are not provided with a spindle brake and the spindle brakes on other drill presses have insufficient strength to hold the spindle against the contrary urging of a material force, such as the compressed spiral spring 62. In order to overcome the problem thus created, I have provided a spindle lock in the form of a lock nut 82, which, insofar as its internal opening 83 is concerned, may be substantially identical both to the nut 69 and the lock nut 78, as indicated in Figures 5, 7 and 9. When the lock nut is not in use, it rests upon the boss 56, and a pair of integral, diametrically aligned, stop bosses 84 and 85 extend downwardly from the lower surface of said nut 82 between the fingers 58 and 59 of the bifurcated boss 56, as shown in Figure 8, whereby the nut 82 is held in its non-engaging position with respect to the bar 48.

Figure 10:
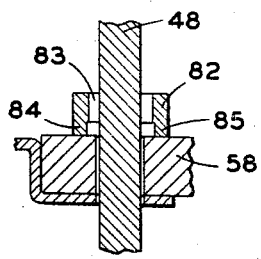
Figure 10 is a sectional view taken along the line X—X of Figure 9.

When it becomes desirable to lock the spindle 11 in a raised position, the spindle lock nut 82 is raised sufficiently to clear the stop bosses 84 and 85 over the tops of the fingers 58 and 59, and the lock nut 82 is then rotated about the bar 48 through an angle which is preferably approximately 90 degrees. The bosses 84 and 85 then rest, as shown in Figure 10, upon the upper surfaces of the fingers 58 and 59, respectively, thereby positively preventing downward movement of the bar 48 with respect to the bifurcated boss 56. Where a spindle lock nut 82 is disposed between the switch operating member 67 and the bifurcated boss 56, the increased distance between the flat element 68 and the switch plunger 66 may be compensated for by offsetting the flat element 68 downwardly, as indicated at 86 in Figure 8.

It will be quickly and readily recognized that the lock nut 78 can be used as a spindle brake simply by placing it beneath the switch operating member 67. The lock nut 78 could then serve the dual purpose of locking either the operating member or the spindle against downward movement. It will be also recognized that, whether the operating member 67 shown in Figure 5 or the alternate structure shown in Figure 8 is utilized, said member will serve the dual purpose of operating the switch 19, as well as indicating on the scale 57 the extent of the downward movement of the spindle 11 during a particular operation thereof.

The spring 62 and the threading of the bar 48 are of opposite hand in order to effect easier sliding relationship therebetween. Normally the bar 48, because of the nuts carried thereon, will be of righthand threading and the spring 62 will be lefthand.

*Operation*

Under normal circumstances, a standard drill press 13 will be provided with some type of depth indicating device, including an elongated bar similar to the depth control bar 48 shown in Figures 1 and 2. Such depth indicator bar is normally mounted upon, and extends upwardly from, some type of bracket, which is secured to the lower end of the quill 37. Thus, this depth indicating device is first removed and replaced by the bracket 46 and the depth control bar 48. However, it may be possible in some instances to use the bracket presently existing on the drill press. In either event, with the spindle in extended downward position and just before the control bar 48 is mounted upon the support bracket 46, the spiral spring 62 is compressed and placed between the bifurcated boss 56 (Figure 4) and the support bracket 46. The switch support plate 63 is then placed between the bifurcated boss 56 and the upper end of the spiral spring 62, which spring firmly holds said plate 63 in position, with the opening 64 thereof aligned with the space between the fingers 58 and 59. The control bar 48 is then inserted between the fingers 58 and 59, through said opening 64 and through the spiral spring 62 so that the lower end 49 of the bar 48 extends through the opening 50 in the support bracket 46. Said bar is then rigidly fastened in place with respect to the bracket 46 by the nut 51 or alternate cap screw structure. After the support bracket 46 and depth control bar 48 are firmly and securely mounted in place, as shown in the drawings, the operating member 67 and the lock nut 78, if desired, are quickly and easily sleeved upon, and slid down, the control bar 48. When they reach some desired position along said bar, they are then turned approximately 90 degrees in either rotational direction to hold them against further movement, either upward or downward, with respect to the bar 48. The cap nut 80 may be placed on top of the control bar 48, if desired, for preventing accidental removal of the operating member 67 and lock nut 78 from the bar 48.

The switch 19 is mounted upon the offset portion 65 of the support plate 63 and then connected, as indicated in Figure 4, in series with the on-off switch 31 and the motor 14. The drill press 13 is now ready for automatic operation by the feed and depth control 10 in substantially the following manner.

The on-off switch 31 is opened, thereby preventing the passage of energy to the motor 14. The spindle is raised by the handle 18 and locked in such position by means such as the brake 32. The plunger 66 on the toggle switch 19 is depressed, thereby closing the toggle switch. The operating member 67 is then rotated about the bar 48 into the slipping position, substantially as shown in Figure 7, so that it may be moved upwardly or downwardly, without interference from the threads on the bar 48. Said member 67 is then moved lengthwise of the bar 48, as desired, after which it is rotated into the position substantially as shown in Figure 6. The location of the member 67 along the bar 48 will depend upon the distance which it is desired that the spindle 11 move downwardly for any particular operation. The scale 57 can be arranged to indicate this information accurately.

If desired, the lock nut 78 can then be moved downwardly, as shown in Figure 5, until it rests upon the top of the operating member 67, after which it is then rotated until it firmly engages the upper surface of said member 67. In the event that it is not necessary to use the lock nut 78, it may be moved upwardly and rotated into storage position against the cap nut 80.

A work piece is then placed upon the work table 16, which table is moved upwardly into position with the work adjacent the lower end of the drill bit, or other tool, in the chuck 24. The manual feed control is then held against the down spring pressure and the brake 32, or similar device for holding the spindle in the raised position, is then released and the spindle is lowered by hand control lever until the bit engages the work piece. The motor 14 is energized by closing the on-off switch 31 which causes the spindle 11 to rotate in a conventional manner. The compressed, spiral spring 62 will urge the spindle 11 downwardly toward the work table 16 until the operating member 67 engages and depresses the plunger 66, which opens the switch 19, thereby de-energizing the motor and stopping the rotation of the spindle. It will be recognized that the drilling operation can be commenced with the spindle 11 in any axial position and such position will depend largely upon the distance which the spindle must move downwardly for the given operation. However, it will be recognized that different types of operations performed by the drill press 13 may require different amounts of force urging the spindle downwardly. The downward force of the spring 62 decreases and the upward force of the spring 42 increases as the spindle moves downwardly. Thus, the starting elevation of the spindle 11 may be governed to some extent by this fact. However, such downward force can be adjusted by rotating the drum 43 of the adjustable, resilient mechanism 17, which alters the tension in the coil spring 42, resisting downward movement of the spindle 11.

It has been found that, with this attachment, where a normal drilling operation is being performed, the downward thrust imposed upon the spindle 11 is advantageously relaxed as the drill bit approaches the break-through point with respect to the work piece. Normally, such control requires manual operation by a skilled operator. However, because of the above described operation of the opposing forces produced by the coil spring 42 and spiral spring 62, the break-through pressure imposed upon the spindle 11 can be accurately adjusted through a relatively wide range, and caused to simulate manual control.

After a drilling operation has been completed, the spindle 11 is again raised, where it may be held by the spindle brake 32 while a new work piece is placed upon the table 16. The on-off switch 31 is opened, the toggle switch 19 is closed, the spindle brake 32 is released, and the on-off switch is again closed, thereby commencing the rotation of the spindle 11 and its downward movement, due to the urging of the spring 62, through a new work piece.

If the drill press 13 is provided with an inadequate spindle brake, or no spindle brake whatever, this problem can be quickly and easily overcome by placing a spindle lock nut 82 on the depth control bar 48 between the bifurcated boss 56 and the operating member 67. Such spindle lock nut 82 will be utilized in the manner described hereinabove for holding the spindle 11 in the raised position. When not in use, the spindle lock nut 82 will rest upon the upper surface of the boss 56, where it will be held in position with respect thereto by the stop bosses 84 and 85.

There may be occasions, as where the bit 25 becomes wedged in a work piece which is anchored upon the table 16, when it becomes desirable to move the element 68 away from a position adjacent to said plunger 66 so said plunger can be manually actuated to energize or de-energize the motor. This is easily accomplished simply by swinging said element 68 away from the housing 12. The normal upward slope of the screw threads will relieve any binding during such movement.

Although particular, preferred embodiments of the invention have been described in detail hereinabove for illustrative purposes, it will be recognized that variations or modifications thereof, which do not depart from the scope of such invention, are fully contemplated unless specifically stated to the contrary in the appended claims.

I claim:

1. An automatic depth and feed control attachment for use on a drill press having a housing in which a quill is axially reciprocable, said drill press having an electric motor for operating the drill and having a manually operable handle controlling axial movement of said quill, said housing having structure for guiding vertical movement of a bar, said attachment comprising: a bracket connectible to the lower end of said quill; a bar secured to said bracket and extending upwardly therefrom, said bar being adapted to be received in said guiding structure; a switch mounted on said bar, said bar being movable axially with respect to switch, said switch being connectible to said electric motor for controlling energization thereof; a switch operator secured to said bar in the upper portion thereof, said switch operator being adjustable axially of said bar and being axially aligned with said switch so that said operator will actuate said switch upon a predetermined movement of said bar with respect to said switch; and an axially elongated coil spring surrounding the lower portion of said bar with its lower end bearing against the upper surface of said bracket and its upper end being adapted to bear against the lower surface of the guiding structure.

2. The attachment as defined in claim 1 wherein said switch is mounted on a switch support plate, said switch support plate having an opening therethrough through which said bar slidably extends, the upper end of said coil spring bearing against the lower surface of said switch support plate and being adapted to urge said plate against the lower surface of said guiding structure.

References Cited in the file of this patent

UNITED STATES PATENTS

| | | |
|---|---|---|
| 20,469 | Daggett | June 1, 1858 |
| 1,862,866 | Storm | June 14, 1932 |
| 2,055,888 | Yager et al. | Sept. 29, 1936 |
| 2,104,123 | Grosser | Jan. 14, 1938 |
| 2,365,267 | Heinemann | Dec. 17, 1944 |
| 2,396,733 | Wiken et al. | Mar. 19, 1946 |
| 2,490,307 | Karr | Dec. 6, 1949 |
| 2,664,768 | Clyne | Jan. 5, 1954 |
| 2,683,998 | Leggett | July 20, 1954 |